United States Patent
Rossello et al.

(10) Patent No.: US 7,133,934 B1
(45) Date of Patent: *Nov. 7, 2006

(54) ADAPTIVE ERROR CORRECTION FOR COMMUNICATIONS OVER PACKET NETWORKS

(75) Inventors: Norbert Rossello, Biot (FR); Fabien Klein, Antibes (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 879 days.

This patent is subject to a terminal disclaimer.

(21) Appl. No.: 10/229,438

(22) Filed: Aug. 27, 2002

(51) Int. Cl.
   *G06F 15/16* (2006.01)
   *H04J 3/16* (2006.01)
   *H04J 3/22* (2006.01)
   *H03M 13/00* (2006.01)

(52) U.S. Cl. ............... 709/249; 370/465; 379/900; 714/774

(58) Field of Classification Search ............... 709/232, 709/237, 249; 379/93.08, 93.31, 100.17, 379/900; 358/426.09; 370/352, 465, 516; 714/751, 774
See application file for complete search history.

(56) References Cited

U.S. PATENT DOCUMENTS

| | | | | |
|---|---|---|---|---|
| 4,047,151 A * | 9/1977 | Rydbeck et al. | ............ | 714/774 |
| 5,200,962 A * | 4/1993 | Kao et al. | ............ | 714/774 |
| 5,440,405 A * | 8/1995 | Ahmed | ............ | 358/435 |
| 5,528,595 A * | 6/1996 | Walsh et al. | ............ | 370/402 |
| 5,617,423 A * | 4/1997 | Li et al. | ............ | 370/426 |
| 5,699,369 A * | 12/1997 | Guha | ............ | 714/774 |
| 5,739,919 A * | 4/1998 | Lee et al. | ............ | 358/407 |
| 5,748,333 A * | 5/1998 | Yoshida | ............ | 358/445 |
| 5,790,641 A * | 8/1998 | Chan et al. | ............ | 379/100.17 |
| 5,999,598 A * | 12/1999 | Henrick et al. | ............ | 379/93.07 |
| 6,023,470 A * | 2/2000 | Lee et al. | ............ | 370/401 |
| 6,028,679 A * | 2/2000 | Murphy | ............ | 358/407 |
| 6,044,485 A * | 3/2000 | Dent et al. | ............ | 714/774 |
| 6,256,115 B1 * | 7/2001 | Adler et al. | ............ | 358/442 |
| 6,356,545 B1 * | 3/2002 | Vargo et al. | ............ | 370/355 |
| 6,400,728 B1 * | 6/2002 | Ott | ............ | 370/465 |
| 6,438,105 B1 * | 8/2002 | Qarni et al. | ............ | 370/231 |
| 6,504,838 B1 * | 1/2003 | Kwan | ............ | 370/352 |
| 6,549,587 B1 * | 4/2003 | Li | ............ | 375/326 |
| 6,714,988 B1 * | 3/2004 | Takemoto et al. | ............ | 709/249 |
| 6,757,367 B1 * | 6/2004 | Nicol | ............ | 379/90.01 |
| 6,850,577 B1 * | 2/2005 | Li | ............ | 375/326 |
| 6,865,220 B1 * | 3/2005 | Abrishami | ............ | 375/220 |
| 6,980,528 B1 * | 12/2005 | LeBlanc et al. | ............ | 370/290 |

(Continued)

OTHER PUBLICATIONS

Rosenberg, J. "Request for Comments (RFC) 2733: An RTP Payload for Generic Forward Error Correction", published by Network Working Group, Dec. 1999, 26 pages.*

*Primary Examiner*—David Wiley
*Assistant Examiner*—George C. Neurauter, Jr.
(74) *Attorney, Agent, or Firm*—Farjami & Farjami LLP

(57) ABSTRACT

An apparatus and method for providing adaptive error correction for a fax and/or modem over packet network session is disclosed. A gateway device configured in accordance with the present invention comprises a controller configured to receive a signal from its local client device and a signal processor coupled to said controller. The signal processor encodes the signal based on a level of error correction selected by the controller. The controller is configured to determine a mode of operation of the local client device from the signal, and then select a level of error correction used by the signal processor to encode the signal based on the determined mode of operation of the local client device.

20 Claims, 7 Drawing Sheets

U.S. PATENT DOCUMENTS

| | | | |
|---|---|---|---|
| 6,985,481 B1 * | 1/2006 | Brent et al. | 370/352 |
| 6,987,821 B1 * | 1/2006 | Li | 375/345 |
| 2002/0034284 A1 * | 3/2002 | Kang | 379/100.06 |
| 2002/0164002 A1 * | 11/2002 | Beadle et al. | 379/93.01 |
| 2002/0176401 A1 * | 11/2002 | Ryan et al. | 370/352 |
| 2003/0123436 A1 * | 7/2003 | Joseph et al. | 370/352 |
| 2003/0164986 A1 * | 9/2003 | Boire-Lavigne et al. | 358/400 |
| 2003/0189720 A1 * | 10/2003 | Bei et al. | 358/1.15 |
| 2004/0179514 A1 * | 9/2004 | Brent et al. | 370/352 |
| 2004/0190499 A1 * | 9/2004 | Chen et al. | 370/352 |
| 2005/0200891 A1 * | 9/2005 | Cohen | 358/1.15 |

\* cited by examiner

ADAPTIVE ERROR CORRECTION FOR COMMUNICATIONS OVER PACKET NETWORKS

BACKGROUND OF THE INVENTION

1. Field of the Invention

The present invention relates generally to communications over packet networks. More particularly, the present invention relates to error correction for modem and fax communications over a packet network, such as the Internet, utilizing the Internet Protocol ("IP").

2. Related Art

In recent years, packet-based networks, such as the Internet, have begun to replace the traditional analog telephone networks for transportation of voice and data. For example, with the emergence of voice over IP ("VoIP"), telephone conversations may now be captured, packetized and transported over the Internet. In a conventional VoIP system, telephone conversations or analog voice may be transported over the local loop or the public switch telephone network ("PSTN") to the central office ("CO"). From the CO, the analog voice is transported to a gateway device at the edge of the packet-based network. The gateway device converts the analog voice or speech to packetized data using a codec (coder/decoder), according to one of various existing protocols, such as G.729, G.711, G.723.1, etc. Next, the packetized data is transmitted over the Internet using the Internet Protocol for reception by a remote gateway device and conversion back to analog voice.

More recently, focus has been directed toward using the existing packet-based network and gateway devices, which have been designed to support the transportation of analog voice or speech over IP, to further support facsimile ("fax") communication over packet networks (e.g., Fax over Internet Protocol ("FoIP")) and modem communication over packet networks (e.g., Modem over Internet Protocol ("MoIP")). FIG. 1 illustrates a block diagram of a conventional communication model for data communication over a packet-based network, such as the Internet. As shown, communication model 100 includes first client communication device 110 in communication with first gateway communication device 120 over PSTN providing transmit and receive channels 112 and 114. Communication model 100 further includes second client communication device 150 in communication with second gateway communication device 140 over PSTN providing transmit and receive channels 144 and 142. Communication model 100 enables communications between first gateway communication device 120 and second gateway communication device 140 via a packet network 130 utilizing the Internet Protocol. The Internet Protocol implements the network layer (layer 3) of a network protocol, which contains a network address and is used to route a message to a different network or subnetwork. The Internet Protocol further accepts packets from the layer 4 transport protocol, such as Transmission Control Protocol ("TCP") or User Data Protocol ("UDP"), and adds its own header and delivers the data to the layer 2 data link protocol. TCP provides transport functions, which ensures that the total amount of bytes sent is received correctly at the other end. UDP, which is part of the TCP/IP suite, is an alternate transport that does not guarantee delivery. It is widely used for real-time voice and video transmissions where erroneous packets are not retransmitted.

For purposes of FoIP, communication devices 110, 120, 140 and 150 are capable of performing facsimile functions. For MoIP, communication devices 110, 120, 140 and 150 are capable of performing modem functions. Facsimile and modems devices are capable of converting digital pulse to audio frequencies (modulation) and vice versa (demodulation) for transmission of fax or modem data over an analog telephone line using corresponding transmission modulation systems. For example facsimile devices may support a variety fax modulation standards, such as those defined in the ITU (International Telecommunications Union) Group 3 protocols: V.21, V.17, V.27 or V.29, for example. Similarly, modems may support a variety of data modulation standards, such as ITU standards: V.22bis, V.34, V.90 or V.92, etc. Communication devices 110, 120, 140 and 150 may also be cable or DSL modems, which are all digital and technically not modems, but referred to as modems in the industry. Most modems are also capable of supporting various voice and facsimile standards.

Conventionally, the communication process for a FoIP session begins when first client fax (("F1") or first client communication device 110) calls first gateway (("G1") or first gateway communication device 120). As a result, G1 calls second gateway (("G2") or second gateway communication device 140), and G2 in turn calls second client fax (("F2") or second client communication device 150).

Typically, G1 and G2, in their default mode of operation, communicate in voice mode and are configured to use a compressed voice protocol, such as the ITU standard G.723.1. As the calling device, F1 transmits a calling ("CNG") tone (a 1100 hertz (Hz)) half-second tone repeated every 3.5 seconds) when initiating a call to F2. This CNG tone causes G1 and G2 to switch to an uncompressed voice protocol, such as ITU standard G.711, which provides toll quality audio at 64 Kbps using either A-Law or μ-Law pulse code modulation methods. This uncompressed digital format is used in order to allow easy connections to legacy telephone networks. By switching to G.711, the tones generated by F1 may propagate through G1 and G2 in a more intact manner in order to reach F2 at the other side.

One existing method provides for maintaining G1 and G2 in G.711 or "pass through" mode, such that F1 and F2 are able to exchange control commands over packet network 130 and transfer data using G.711 packets using the Internet Protocol. However, such solution suffers from various problems, such as packet losses. Similar problems, including packet losses, also occur during MoIP sessions in pass through mode. Packet losses degrade communication over a packet network, resulting in communication errors between the client devices during FoIP and/or MoIP sessions. Packet losses are particularly problematic over wide-area connections.

One solution advanced to overcome packet losses while in the pass through mode for MoIP and FoIP sessions is the use of Generic Forward Error Correction ("FEC") for encoding data transmitted over the packet network, as described in the Request for Comments ("RFC") document 2733 ("An RTP Payload Format for Generic Forward Error Correction" by J. Rosenberg, December 1999) which his hereby incorporated by reference. In general FEC compensates for packet losses by transmitting FEC packets in addition to the original "media" stream (i.e., voice, fax or modem signals). At the receiver, the FEC packet and the original media are received. If no media packets have been lost, the FEC packet can be ignored. In the event of media packet losses, the FEC packets can be combined with other media and the FEC packets that have been received, resulting in recovery of the missing media packets.

Depending on the particular encoding scheme selected for FEC encoding, a tradeoff between overhead, delay, and recoverability results. For example, a higher level or more complex FEC encoding scheme may provide better recoverability but may result in greater overhead and longer delay. Conversely, a lower level or less complex FEC encoding scheme may require less overhead and incur less delay, but may not provide the same degree of recoverability as the higher level encoding scheme.

In practice, a fixed low-level FEC encoding scheme is used, primarily because of the greater overhead and longer delay associated with higher level and more complex FEC encoding schemes. In a fixed or static data encoding algorithm, a selected FEC encoding scheme is used for encoding all voice, fax and modem data (i.e., for all phases) during the session. A fixed low level FEC encoding scheme is normally satisfactory for voice communication (VoIP) where small losses of voice data are unperceivable or minimally perceivable by users. However, for FoIP and MoIP communications, the loss of critical data could result in such severe errors, such as loss of connection or the necessity for retraining, significantly degrading performance and creating dissatisfaction in customers.

SUMMARY OF THE INVENTION

In accordance with the purposes of the present invention as broadly described herein, there is provided an apparatus and method for providing adaptive error correction for a fax and/or modem over packet network session. The packet network generally includes a first gateway device communicatively coupled to a first client device and to a second gateway device, the second gateway device further communicatively coupled to a second client device. The first and second gateway devices are communicatively coupled to each other over a packet network, such as the Internet, for example.

A gateway device configured in accordance with the present invention generally comprises a controller configured to receive a signal from its local client device and a signal processor coupled to the controller. The signal processor is configured to encode the signal based on a level of error correction selected by the controller. In accordance with one embodiment of the present invention, the controller is configured to determine a mode of operation of the local client device from the signal, and then select a level of error correction used by the signal processor to encode the signal based on the determined mode of operation of the local client device. After the signal is encoded, the controller transmits the encoded signal to the destination gateway device for decoding and transmission to the destination client device.

According to one embodiment of the present invention, the gateway device comprises at least one tone detector communicably coupled to the controller. The tone detector is configured to detect a characteristic of the signal, where the characteristic indicates the mode of operation of the local client device.

According to another embodiment of the present invention, the gateway device comprises a demodulator for demodulating the signal. The controller then determines the mode of operation of the local client device by inspecting the demodulated signal.

The present invention is suitable for use with fax communications over packet networks (e.g., FoIP) and modem communications over packet networks (e.g., MoIP).

In accordance with another embodiment of the present invention, a method for providing adaptive error correction comprises: receiving, by a gateway, a signal transmitted by its local client device, detecting a mode of operation of the local client device from the signal, selecting a level of error correction to encode the signal based on the detected mode of operation, and encoding the signal using the selected level of error correction. After encoding the signal, the method further comprises transmitting the encoded signal to a destination gateway.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention may be described herein in terms of functional block components and various processing actions. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of techniques for data reception and transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. For example, although the present invention is described using a fax over IP network and modem over IP network, it should be noted that the present invention may be implemented in other communication networks and is not limited to fax over IP or modem over IP. Indeed, for the sake of brevity, conventional data transmission, compression/decompression, error correction, encoding, decoding, signaling and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
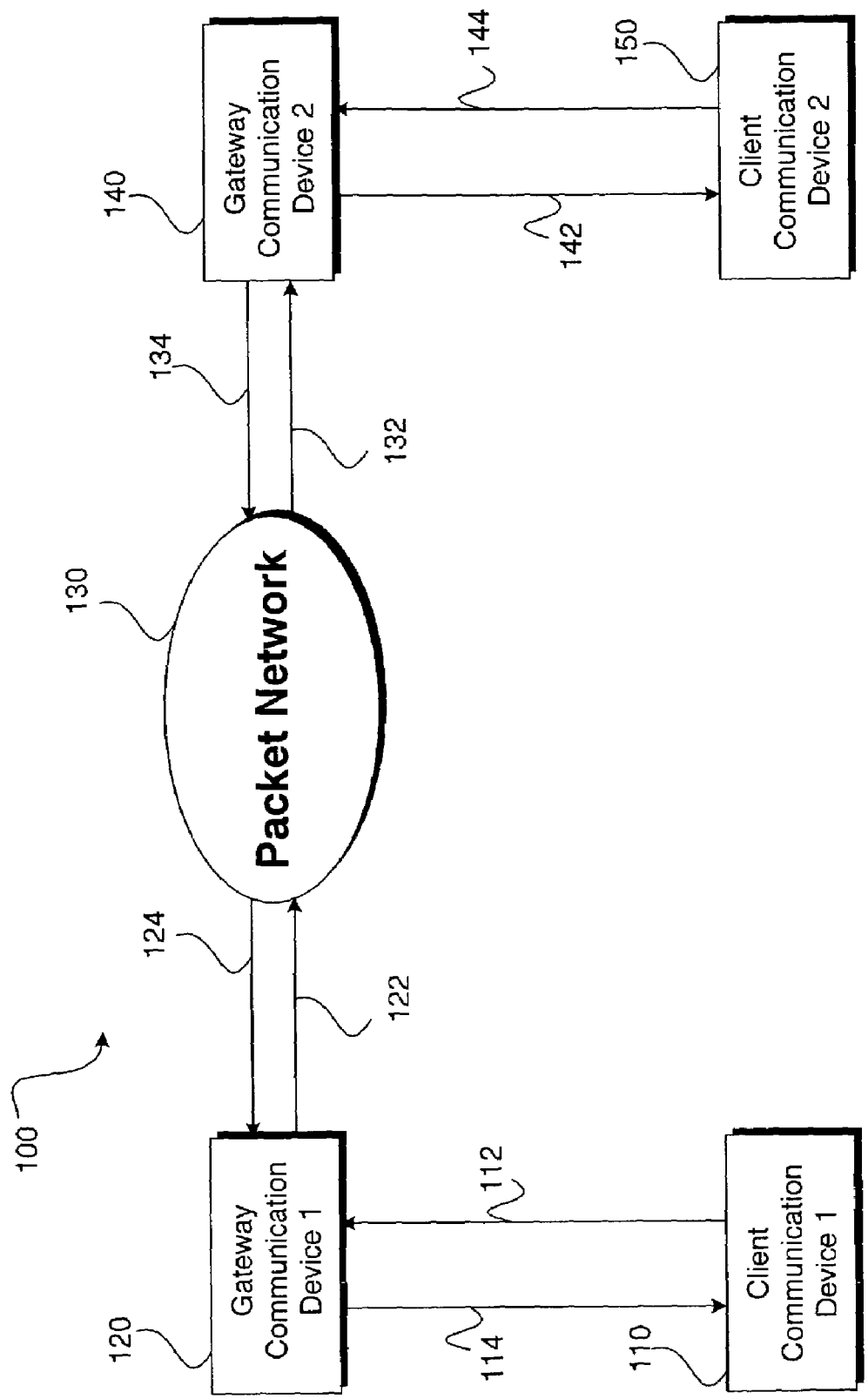
FIG. 1 illustrates a block diagram of a prior art communication model based on a packet network, such as the Internet, utilizing the Internet Protocol.
Figure 2:
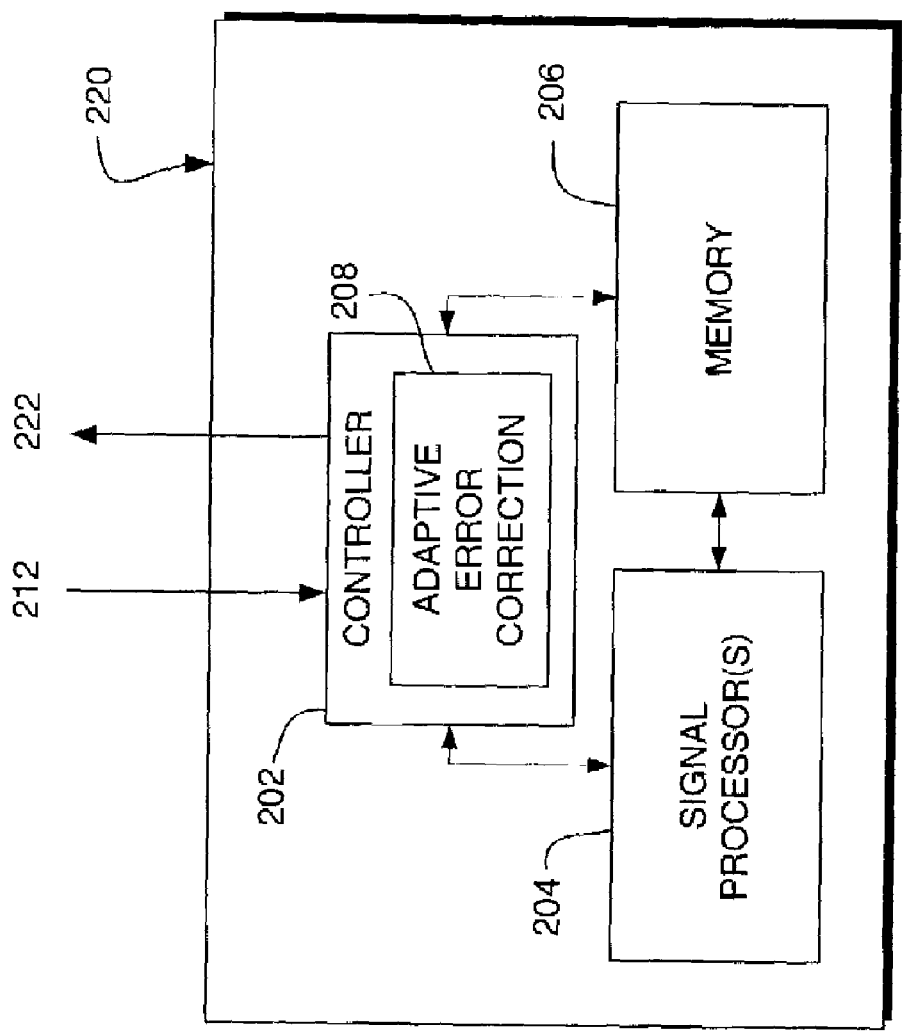
FIG. 2 illustrates a block diagram of a gateway device configured to provide adaptive error correction according to one embodiment of the present invention.

Referring now to FIG. 2, as well as FIG. 1, a block diagram of an illustrative gateway device 220 configured to provide adaptive error correction according to one embodiment of the present invention is shown. Gateway device 220 may replace gateway device 120 and/or gateway device 140 in communication model 100 of FIG. 1 to provide adaptive error correction for signals communicated through packet network 130.

Gateway 220 comprises a controller 208 for processing signals communicated to gateway 220. Controller 208 receives signals via communication line 212 and transmits signals via communication line 222. Controller 208 is further coupled for communication to a memory 206 and to one or more signal processors 204.

Controller 208 comprises a processor, such as an ARM® microprocessor, for example. In certain embodiments, a plurality of controllers 208 may be used to enhance the performance of gateway 220 or to provide greater channel density. Similarly, a plurality of signal processors 204 may be used to provide increased performance and/or channel density of gateway 220.

Memory 206 stores information accessible by controller 208 and signal processor 204. For example, memory 206 may store one or more encoding schemes, which may be loaded into signal processor 204 for encoding a signal received by controller 202.

Signal processor 204 carries out the operation of converting a signal received from input channel 222 into a digitized and packetized format using an appropriate codec for transmission over packet network 130 to a destination device. For example, as noted above, fax signals in "pass through" mode are encoded by signal processor 204 using the G.711 protocol for transmission over packet network 130.

In accordance with the present invention, an adaptive error correction module 208 is executed by controller 202. Adaptive error correction module 208 generally comprises software, which is executed by controller 202 to control the encoding scheme used by signal processor 204 by signaling signal processor 204 to use one of a plurality of error correction encoding schemes, at least two of which have different levels of error correction. This arrangement allows controller 202 to provide higher level error correction for certain important or critical phases of fax (or modem) operation and lower level error correction for less critical phases of fax (or modem) operation. As described in greater detail below, controller 202 determines the phase of operation of the fax (or modem) by detecting a characteristic of the fax (or modem) signal transmitted by the fax (or modem).

For purposes of the present invention, references to "fax signal" and "modem signal" will refer to the signals communicated by fax and modem devices, respectively. Referring again to FIG. 1, the fax signals transmitted by a "sending" fax (e.g., client 110) are received by gateway 220 (which replaces gateway 110) and are encoded by gateway 220 using adaptive error correction (e.g., adaptive FEC) as described herein. The encoded fax signal is transmitted by gateway 220 to a destination gateway (e.g., gateway 140) over packet network 130. Upon receipt, the destination gateway (gateway 140) decodes the encoded fax signal, and transmits the decoded fax signal to the destination fax (e.g., client 150). As described in more detail below, gateway 220 determines the mode of operation of its local client device by detecting a characteristic in the signal transmitted by the client device and adjusting the level of error correction dynamically based on the mode of operation.

Also for purpose of the present invention, references to "high," "higher," "medium," "low" and/or "lower" levels of error correction relate to a qualitative and/or quantitative difference in the level of error correction applied to a signal as encoded by signal processor 204. Accordingly, a "higher level" error correction encoding scheme will generally provide more robust error correction than a "lower level" error correction encoding scheme; a "high level" error correction encoding scheme will generally provide more robust error correction than a "medium level" error correction encoding scheme; and a "medium level" error correction encoding scheme will generally provide more robust error correction than a "low level" error correction encoding scheme. Additionally, it is noted that error correction generates a number of packets proportionally to its encoding level (i.e., a higher level error correction generates more packets than a lower level error correction). Accordingly adapting error correction not only optimizes packet loss recovery but also minimizes packet overhead. The different levels of error correction may be employed through a single codec having multiple error correction coders or through multiples codec that have different levels of error correction. As noted above, the present invention may further provide support for greater granularities of error correction levels. The details of a particular level of error correction encoding scheme will not be described with great specificity herein. Rather, the present discussion will be primarily directed toward the dynamic or adaptive selection of error correction encoding based on the mode of operation of the client device as determined by gateway 220.

Figure 3:
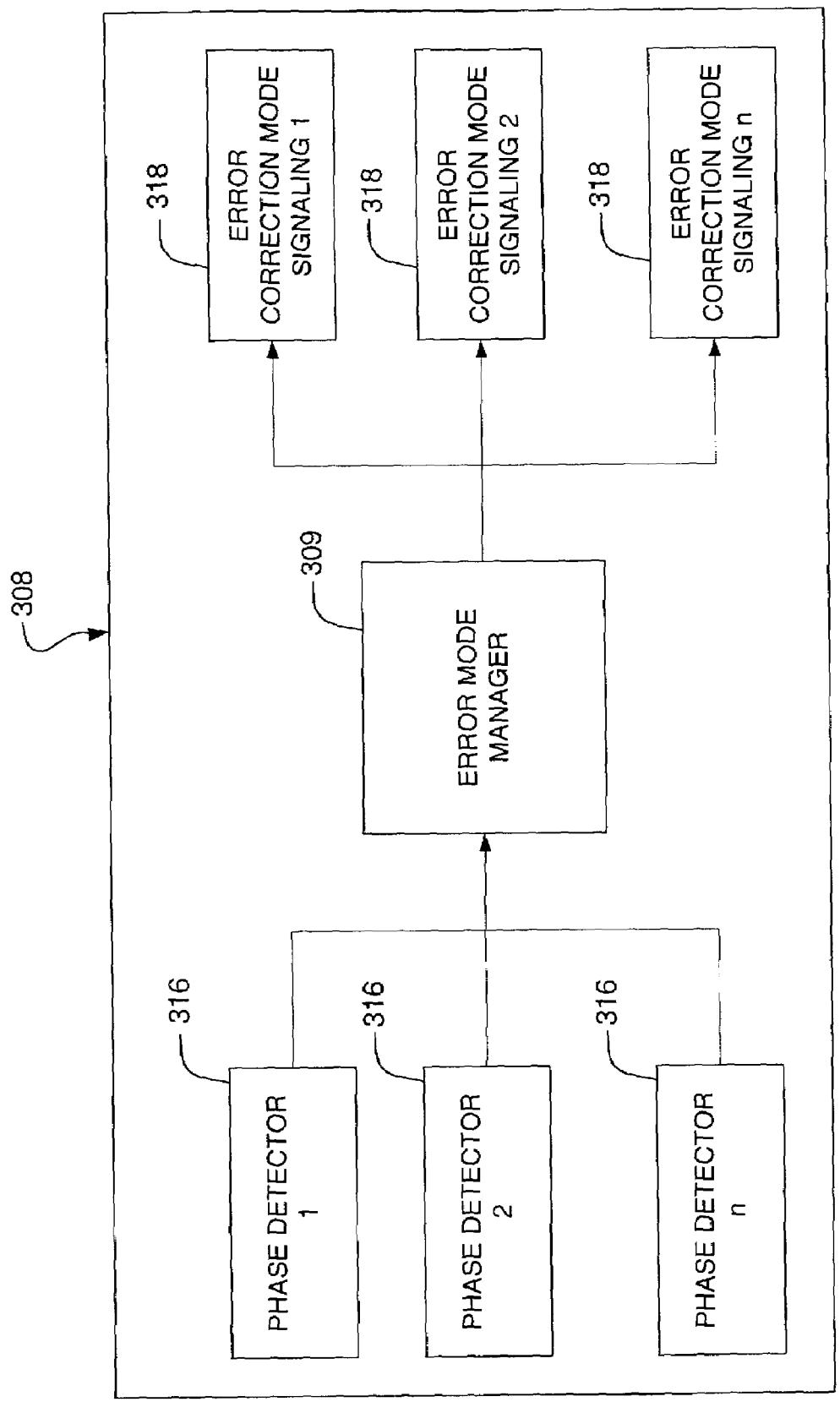
FIG. 3 illustrates a block diagram of an adaptive error correction module according to one embodiment of the present invention.

Referring next to FIG. 3, as well as FIG. 2, a block diagram of an adaptive error correction module 308 according to one embodiment of the present invention and suitable for execution by controller 202 is shown. Adaptive error correction module 308 comprises an error mode manager 309 communicably coupled to one or more phase detectors 316. As illustrated in FIG. 3, a plurality of phase detectors 316 (1 through n) are shown, although the present invention is equally suitable for use with a single phase detector 316 as described below in conjunction with the illustrative embodiment of FIG. 4.

Error mode manager 309 is further communicably coupled to a plurality of error correction mode signaling modules 318 (1 through n) which provide a signal to processor 204 indicating a level of error correction for encoding a signal. In general, the present invention provides at least two (2) different error correction encoding schemes (i.e., having different levels of error correction) for encoding signals, although any plurality of error correction encoding schemes are suitable for use with the present invention. Indeed, a separate level of error correction may be assigned to each of the various modes of operation of a fax or modem device if desired.

Phase detectors 316 are configured to detect a mode of operation of the client device (e.g., fax or modem) communicably coupled to gateway 220. For example, during a FoIP session, the fax devices have several phases of operation, including a call-setup phase, various control phases, a page transfer phase and a listening (or silent) phase, among others. During a MoIP session, the modem devices also have various phases of operation including a call-setup or negotiation phase, a rate renegotiation phase, a retraining phase, a data transmission phase and a data receive phase, among others.

Certain phases of operation during a FoIP or MoIP session are more critical than others. Thus, during a FoIP session, the call-setup phase and control phases are more critical than either the page transfer phase or the listening phase. Likewise, during a MoIP session, the call-setup or negotiation phase, rate renegotiation phase and retraining phase are more critical than the data transmission phase or the data receive phase. In accordance with the present invention, the controller 202 selects a higher level of error correction to encode signals associated with more critical phases, and selects a lower level of error correction to encode signals associated with less critical phases based on the detected mode of operation. According to some embodiments of the present invention, three or more levels of error correction may be defined for the phases of operation of the client devices in accordance with the granularity of error correction levels for gateway 220.

As pointed out above, the mode of operation of the client device is generally determined by detecting a characteristic in the signal transmitted by the client device. In accordance with one embodiment of the present invention, phase detectors 316 are configured as "tone detectors" to detect the transmission of certain tones, audio frequencies, or energy in the signal transmitted by client device. For example, a V.21 detector may be used to detect the transmission of a V.21 signal. Since the fax (or modem) device uses certain protocols during certain modes of operation (e.g., V.21 for call-setup and control phases; V.17, V.27 or V.29 for page transmission), error mode manager 309 is able to determine the mode of operation based on the signal detected from the client device.

Various ways of detecting these particular signals may be used in conjunction with the present invention. For example, a V.21 detector 316 may be configured to detect a V.21 signal by monitoring V.21 detector circuitry operating in gateway 220. In this way, when the V.21 detector circuitry is activated, V.21 detector 316 determines that the signal received by gateway 220 from the client device is a V.21 signal.

If V.21 detector 316 detects the activation of V.21 detector circuitry, a signal is transmitted to error mode manager 309 to indicate the transmission of a V.21 signal. Since V.21 signals are transmitted during "critical phases" wherein important control commands are transmitted (i.e., during call-setup phase or control phases in FoIP), error mode manager 309 signals the appropriate "high level" error correction mode signaling module 318. "High level" error correction mode signaling module 318 then signals signal processor 204 to encode the signal using an appropriate "high level" error correction encoding scheme.

In some embodiments, a silence detector 316 may also be implemented to detect whether client device is operating in a "listening" or "receiving" mode. When silence (i.e., a lack of a Fax signal) is detected by silence detector 316, a signal is transmitted to error mode manager 309 to indicate the activation of "listening" or "receiving" mode. Since "listening" or "receiving" mode is considered the least critical phase in FoIP, error mode manager 309 signals the appropriate "low level" error correction mode signaling module 318. "Low level" error correction mode signaling module 318 then signals signal processor 204 to encode the fax signal using an appropriate "low" error correction encoding scheme.

On the other hand, if a data detector 316 detects the transmission of a Fax data signal that is not a V.21 signal (i.e. where the V.21 detector 316 does not detect activation of V.21 circuitry and where silence detector 316 does not detect silence), a signal is transmitted to error mode manager 309 to indicate the transmission of a data signal. Since data transmit phase (e.g., during page send for FoIP) is less critical, error mode manager 309 signals the appropriate "medium level" error correction mode signaling module 318. Loss of page data is generally considered less critical than loss of control commands, since page data can normally be recovered and/or retransmitted, whereas loss of control may result in both the corruption of page data and the corruption of the FoIP session. "Medium level" error correction mode signaling module 318 then signals signal processor 204 to encode the fax signal using an appropriate "medium" error correction encoding scheme. In other embodiments, a "data" detector may be implemented to directly determine a data transmission mode of operation, rather than indirectly (e.g., by detecting a lack of a V.21 signal and a lack of silence). For example, a data detector could validate a constant flat data energy in a given bandwidth without signal demodulation. Upon detection of such energy, data transmission mode could be directly detected by the data detector.

In accordance with an alternative embodiment of the present invention, phase detectors 316 may be configured as "data detectors" to detect the mode of operation of the client device. In this embodiment, gateway 220 further comprises a demodulator for demodulating the signal received by gateway 220 from the client device. The demodulated data may then be inspected by phase detectors 316 to ascertain the mode of operation of the client device.

Various ways for ascertaining the mode of operation of the client device by inspecting the signal may be used in conjunction with the present invention. For example, the signal may be demodulated and inspected for certain data indicative of commands or instructions (or lack thereof) associated with certain modes of operations (e.g., page transfer signaling or end of page signaling) using techniques known in the art. After the mode of operation is determined by phase detectors 316, a signal is communicated to error mode manager 309 for enabling one of the error correction mode signaling modules 318 corresponding to the level of error correction associated with the determined mode of operation as described above. The enabled error correction mode signaling module 318 then signals signal processor 240 to encode the signal using a corresponding the level of error correction associated with the determined mode of operation. It is noted that in the embodiment where phase detectors 316 are configured as data detectors, additional circuitry (e.g., demodulators) are required and additional overhead and/or delay may be sacrificed in such an arrangement. It is further noted that other means for determining the mode of operation of the client device by adaptive error correction module 208 are suitable for use with the present invention, and that phase detectors 316 employing tone detection or data detection are only illustrative examples.

While the above discussion has been primarily directed to an embodiment employed in a FoIP session, the operations and functions of adaptive error correction module 208 is equally adaptable for modem communications during MoIP sessions to provide adaptive error correction as would be readily apparent to one skilled in the art having the benefit of this disclosure. For example, a V.8 or V.8bis detector 316 (such as the V.21 detector described above) may be used to detect a call set-up mode of operation, in which case a higher level of error correction encoding would be implemented to encode signals. Otherwise, if V.8 or V.8bis detector 316 fails to detect the call set-up mode, a lower level of error correction encoding would be implemented to encode signals.

Thus, during operation of gateway 220, the controller 202 is capable of adaptively or dynamically selecting a suitable level of error correction for encoding a signal transmitted by the client device in accordance with the mode of operation as determined from the signal. Various illustrative embodiments for carrying out adaptive error correction in accordance with the present invention will now be described with reference to FIGS. 4 through 7.

Figure 4:
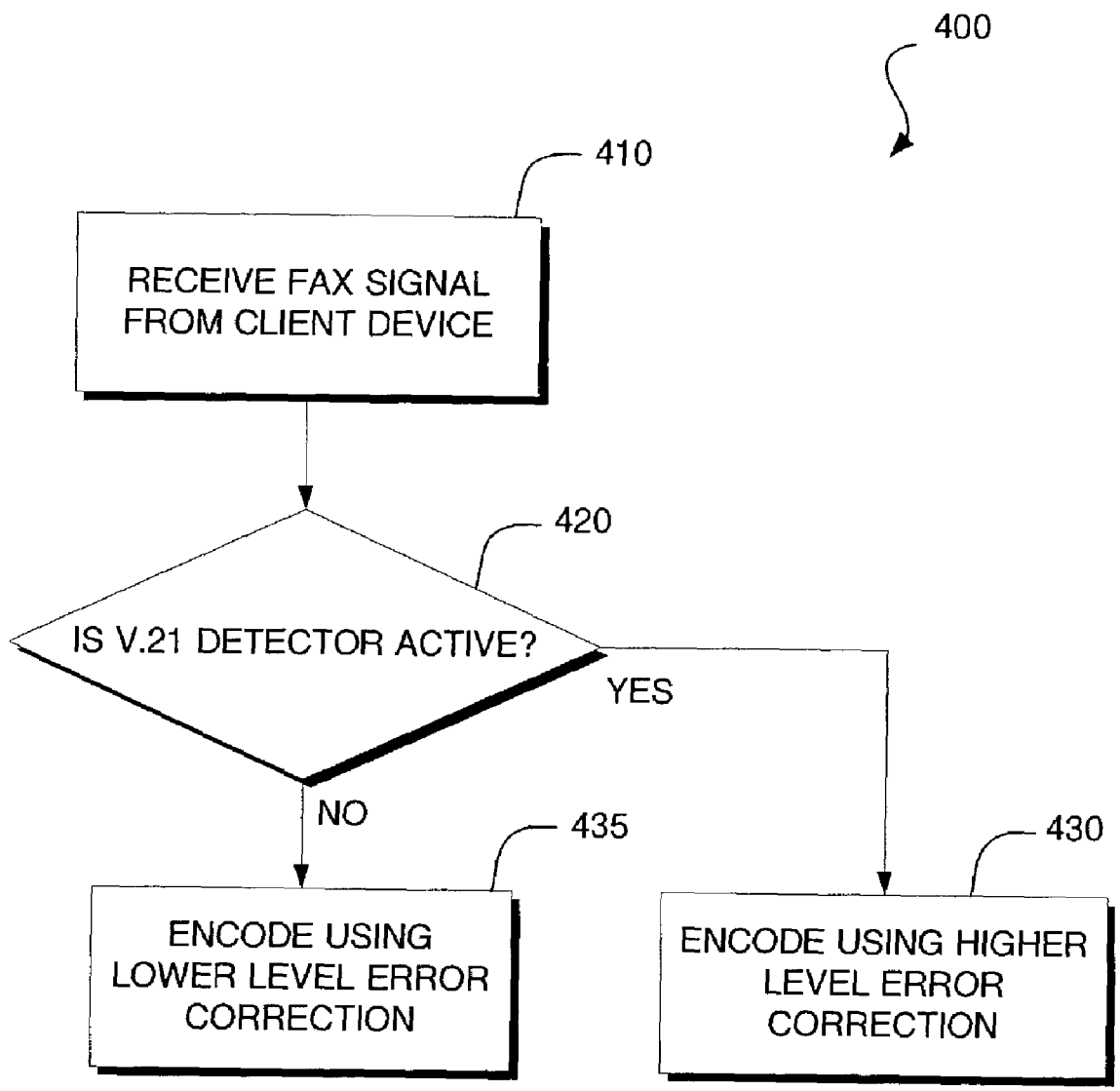
FIG. 4 illustrates a logical flow diagram for carrying out adaptive error correction according to one embodiment of the present invention.

Referring now to FIG. 4, as well as FIGS. 2 and 3, a logical flow diagram 400 for carrying out adaptive error correction for a FoIP session according to one embodiment of the present invention is generally shown. According to this illustrative embodiment, gateway 220 includes at least two different error correction encoding levels for encoding signals: a "higher" level and a "lower" level. The "higher" level is selected during critical or important phases of fax operation; the "lower" level is selected during less critical phases of fax operation.

First at block 410, a fax signal is received by gateway 220 from local fax device 110. The fax signal may be communicated anytime during the FoIP session, such as during the call-setup phase, the control phase, the page-transmit phase, or other fax communication phase. As such, fax device 110 may be either the calling or initiating client device or the answering or destination client device. In either case, gateway 220 provides adaptive error correction for signals transmitted by fax device 110 for transmission over packet network 130.

Next at decision block 420, a V.21 detector 316 determines whether the fax signal received from fax device 110 is a V.21 signal. According to one embodiment, V.21 detector 316 is configured as a "tone detector" and determines whether the fax signal is a V.21 signal by detecting whether V.21 detection circuitry has been activated. In an alternative embodiment, V.21 detector 316 is configured as a "data detector" and determines whether the fax signal is a V.21, signal by demodulating the fax signal and inspecting its data characteristics.

If, at decision block 420, V.21 detector 316 determines that the fax signal received from fax device 110 is a V.21 signal, a signal is communicated to error mode manager 309 indicating the detection of a V.21 signal. Since fax devices transmit V.21 signals during important or critical phases of operation wherein important control commands are transmitted (e.g., call-setup, page control, page acknowledgement, etc.), error mode manager 309 signals "higher level" error correction encoding mode signaling module 318 to instruct signal processor 204 to encode the fax signal with a corresponding higher level error correction encoding scheme. Processing then continues to block 430 where signal processor 204 encodes the fax signal with the specified higher level error correction encoding scheme.

On the other hand, if V.21 detector 316 determines that the fax signal received from fax device 110 is not a V.21 signal, a signal is communicated to error mode manager 309 indicating the non-detection of a V.21 signal. Since the current fax signal is not V.21, the current mode of operation is considered non-critical. Accordingly, error mode manager 309 signals "lower level" error correction encoding mode signaling module 318 to instruct signal processor 204 to encode the fax signal with a corresponding lower level error correction encoding scheme. Processing then continues to block 435 where signal processor 204 encodes the fax signal with the specified lower level error correction encoding scheme.

The encoded fax signal (from block 430 or 435) is then transmitted by gateway 220 to destination gateway 140 over packet network 130 for further processing. The above process is repeated as gateway 220 processes fax signals from fax device 110, thereby providing adaptive error correction based on the mode of operation of fax device 110 during the FoIP session.

Figure 5:
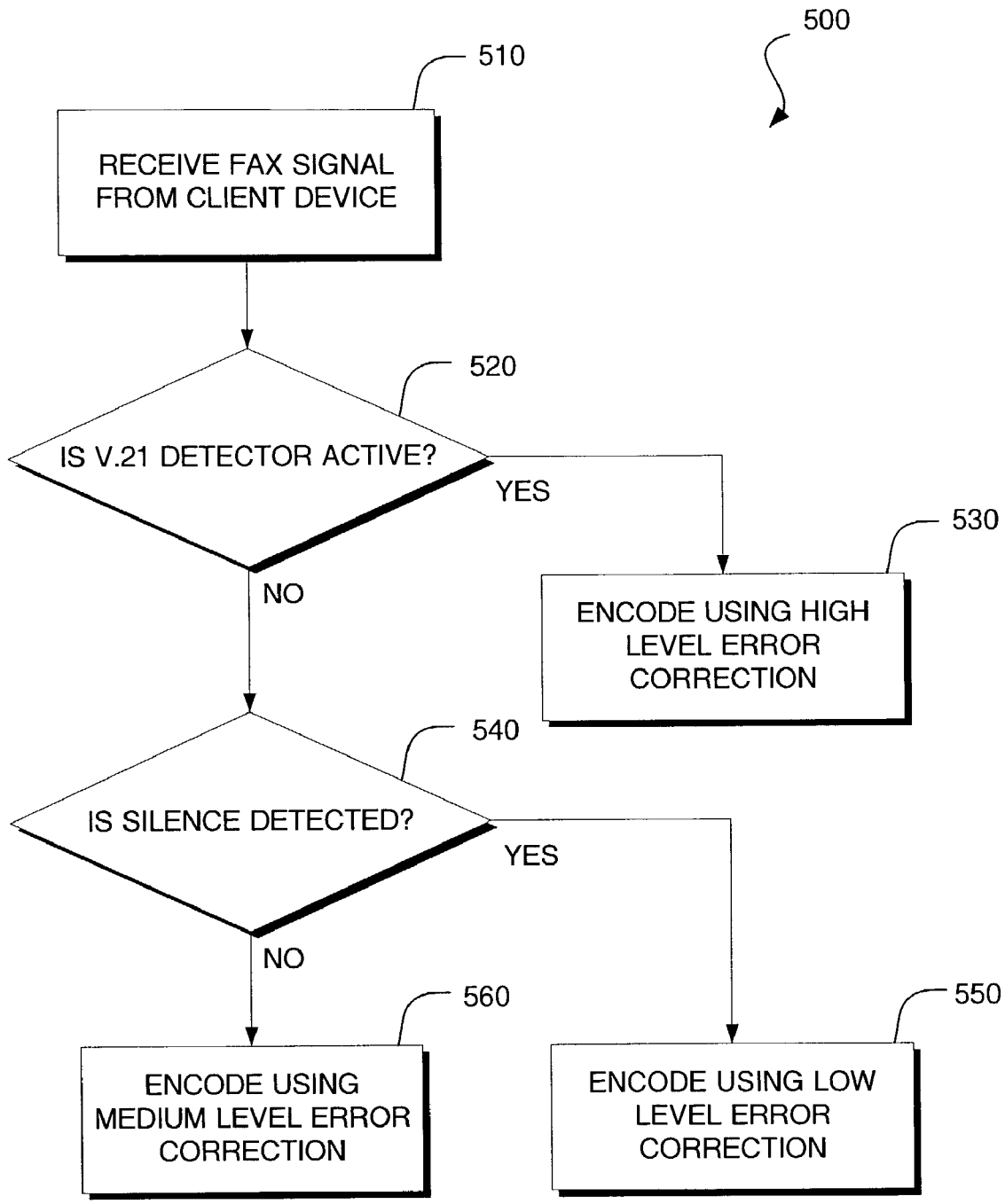
FIG. 5 illustrates a logical flow diagram for carrying out adaptive error correction according to another embodiment of the present invention.

Referring now to FIG. 5, as well as FIGS. 2 and 3, a logical flow diagram 500 for carrying out adaptive error correction for a FoIP session according to another embodiment of the present invention is shown. According to this illustrative embodiment, gateway 220 includes at least three different error correction encoding levels for encoding signals: a "high" level, a "medium" level and a "low" level. The "high" level is selected during critical or important phases of fax operation (e.g., control mode, call-setup mode); the "medium" level is selected during the less critical phases of fax operation (e.g., page send mode); the "low" level is selected during the least critical phase of fax operation (e.g., silent or page receive mode).

First at block 510, a fax signal is received by gateway 220 from its local fax device 110. The fax signal may be communicated anytime during the FoIP session, such as during the call-setup phase, the control phase, the page-transmit phase, or other fax communication phase. As such, fax device 110 may be either the calling or initiating client device or the answering or destination client device. In either case, gateway 220 provides adaptive error correction for signals transmitted by fax device 110 for transmission over packet network 130.

Next at decision block 520, a V.21 detector 316 determines whether the fax signal received from fax device 110 is a V.21 signal. According to one embodiment, V.21 detector 316 is configured as a tone or energy detector and determines whether the fax signal is a V.21 signal by detecting whether V.21 detection circuitry has been activated. In an alternative embodiment, V.21 phase detector 316 is configured as a "data detector" and determines whether the fax signal is a V.21 signal by demodulating the fax signal and inspecting its data characteristics (e.g., detecting 7E flags).

If, at decision block 520, V.21 detector 316 determines that the fax signal received from fax device 110 is a V.21 signal, a signal is communicated to error mode manager 309 indicating the detection of a V.21 signal. Since fax devices transmit V.21 signals during important or critical phases of operation wherein important control commands are transmitted (e.g., call-setup, page control, page acknowledgement, etc.), error mode manager 309 signals "high level" error correction encoding mode signaling module 318 to instruct signal processor 204 to encode the fax signal with a corresponding high level error correction encoding scheme. Processing then continues to block 530 where signal processor 204 encodes the fax signal with the specified higher level error correction encoding scheme.

On the other hand, if V.21 detector 316 determines that the fax signal received from fax device 110 is not a V.21 signal, processing continues to decision block 540 where a silence detector 316 is configured to detect the lack of a Fax signal ("silence") in the fax signal received by gateway 220 from fax device 110.

If, at decision block 540, silence detector 316 determines that the fax signal received from fax device 110 is "silence," a signal is communicated to error mode manager 309 to indicate detection of "silence." Since fax devices are "silent" during the least important or least critical phases of operation (e.g., listening or page receive mode, etc.), error mode manager 309 signals "low level" error correction encoding mode signaling module 318 to instruct signal processor 204 to encode the fax signal with a corresponding low level error correction encoding scheme. Processing then continues to block 550 where signal processor 204 encodes the fax signal with the specified low level error correction encoding scheme.

If, at decision block 540, silence detector 316 determines that the fax signal received from fax device 110 is not "silence" (i.e., that the signal includes a fax signal), a signal is communicated to error mode manager 309 to indicate detection of a fax signal (or "non-silence"). In this case, the fax signal is not detected as a V.21 signal (from decision block 520), and is not considered "silence;" thus, the mode of operation of fax device 110 is determined to be the data transmit phase having "medium" importance. During this phase, typically page data is transmitted by fax device 110 to destination fax device 150. As noted above, page data is not considered as critical as control commands. Error mode manager 309 then signals "medium level" error correction encoding mode signaling module 318 to instruct signal processor 204 to encode the fax signal with a corresponding medium level error correction encoding scheme. Processing then continues to block 560 where signal processor 204 encodes the fax signal with the specified medium level error correction encoding scheme.

The encoded fax signal (from block 530, 550 or 560) is then transmitted by gateway 220 to destination gateway 140 over packet network 130 for further processing. The above process is repeated as gateway 220 processes fax signals from fax device 110, thereby providing adaptive error correction based on the mode of operation of fax device 110 during the FoIP session.

Figure 6:
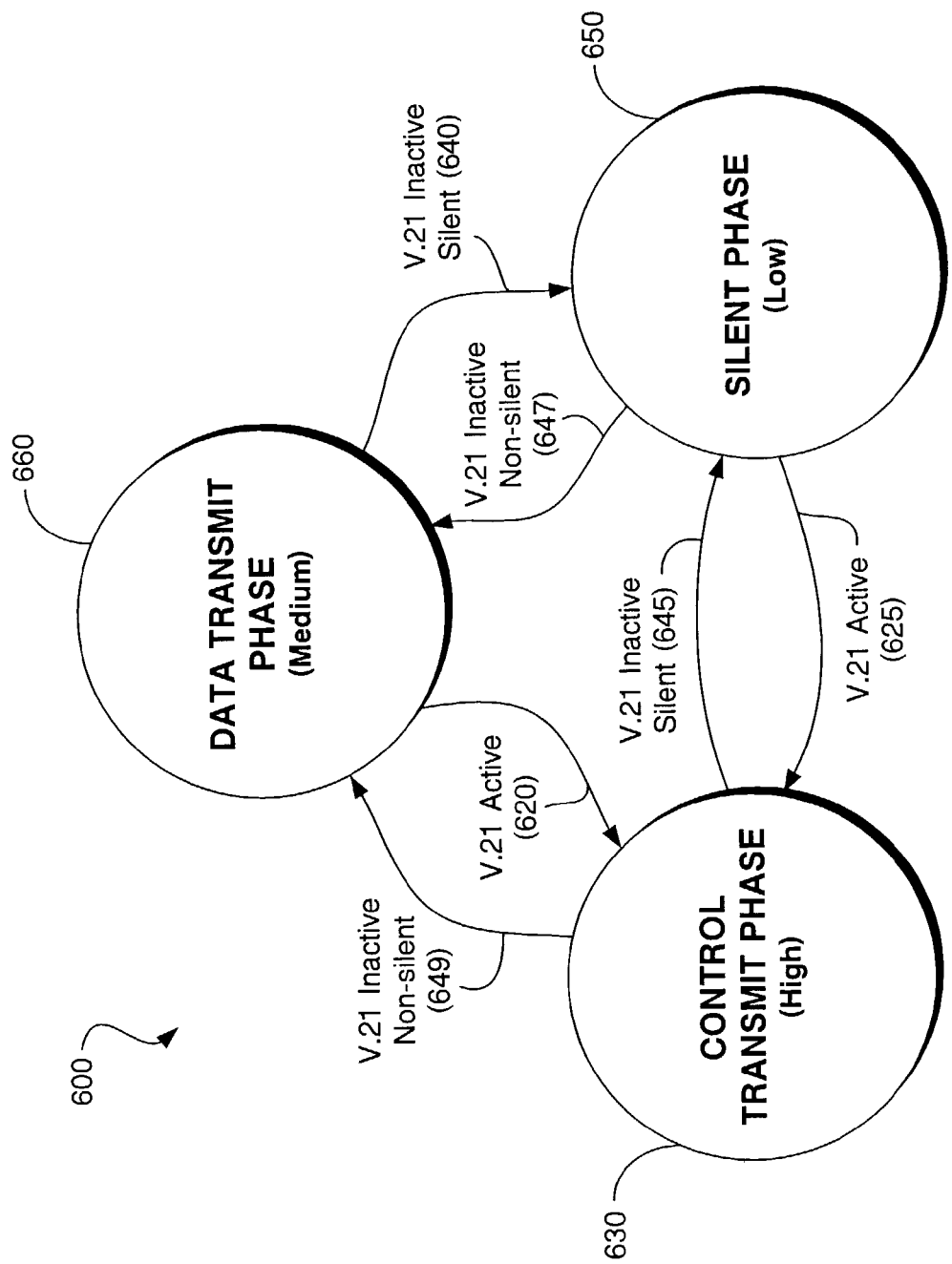
FIG. 6 illustrates a state diagram depicting the state changes during adaptive error correction according to the embodiment of FIG. 5.

Referring now to FIG. 6, as well as FIGS. 2, 3 and 5, there is shown a state diagram 600 depicting the encoding states and state transitions during adaptive error correction according to the embodiment of FIG. 5.

In the illustrative embodiment of FIG. 5, gateway 220 includes at least three different error correction encoding levels for encoding signals, each level corresponding to one or more modes of operation of fax device 110. As depicted in FIG. 6, "high level" error correction encoding state 630 is associated with the control transmit phase of operation. "Medium level" error correction encoding state 660 is associated with the data transmit phase of operation. "Low level" error correction encoding state 650 is associated with the silent phase of operation.

In accordance with the present invention, error mode manager 309 selects a level of encoding based on the mode of operation of its local client device as determined from the fax signal received from the client device. Thus, the level of encoding may dynamically change from one of the encoding states (630, 650 and 660) to another encoding state during the FoIP session depending on the determined mode of operation of the client device.

From "high level" encoding state 630, the level of encoding transitions to "medium level" encoding state 660 when error mode manager 309 determines that the fax signal is not a V.21 signal (as determined during block 520) and is non-silence (as determined during block 540). This state change is depicted via transition path 649. From "high level" encoding state 630, the level of encoding alternatively transitions to "low level" encoding state 650 when error mode manager 309 determines that the fax signal is not a V.21 signal (as determined during block 520) and is silence (as determined during block 540). This state change is depicted via transition path 645.

From "medium level" encoding state 660, the level of encoding transitions to "high level" encoding state 630 when error mode manager 309 determines that the fax signal is a V.21 signal (as determined during block 520). This state change is depicted via transition path 620. From "medium level" encoding state 660, the level of encoding alternatively transitions to "low level" encoding state 650 when error mode manager 309 determines that the fax signal is not a V.21 signal (as determined during block 520) and is silence (as determined during block 540). This state change is depicted via transition path 640.

From "low level" encoding state 650, the level of encoding transitions to "medium level" encoding state 660 when error mode manager 309 determines that the fax signal is not a V.21 signal (as determined during block 520) and is non-silence (as determined during block 540). This state change is depicted via transition path 647. From "low level" encoding state 650, the level of encoding alternatively transitions to "high level" encoding state 630 when error mode manager 309 determines that the fax signal is a V.21 signal (as determined during block 520). This state change is depicted via transition path 625.

Figure 7:
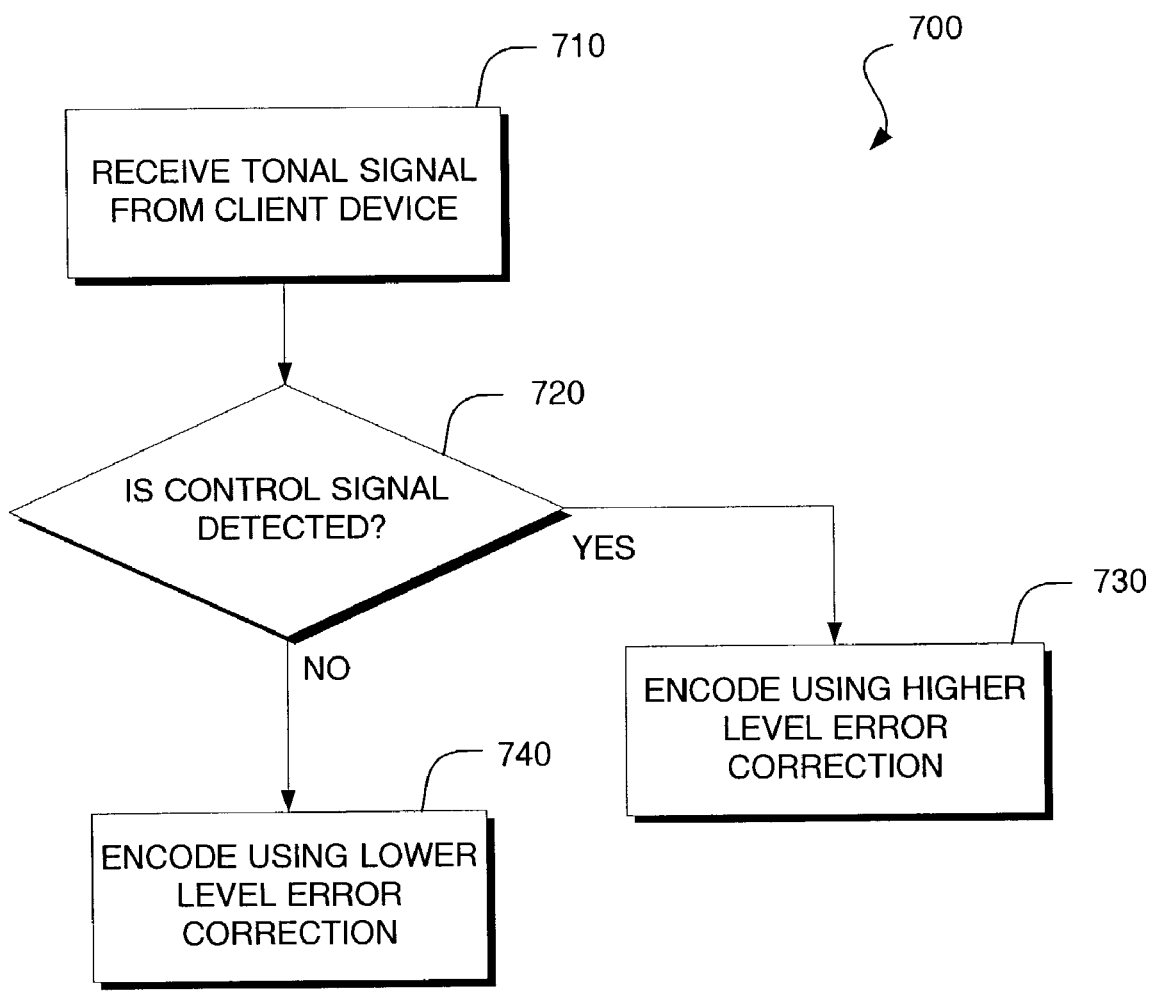
FIG. 7 illustrates a logical flow diagram for carrying out adaptive error correction according to another embodiment of the present invention.

Referring now to FIG. 7, as well as FIGS. 2 and 3, a logical flow diagram 700 for carrying out adaptive error correction for a MoIP session according to another embodiment of the present invention is generally shown. According to this illustrative embodiment, gateway 220 includes at least two different error correction encoding levels for encoding signals: a "higher" level and a "lower" level. The "higher" level is selected during critical or important phases of modem operation wherein control commands are communicated (e.g., call-setup or rate negotiation mode, rate renegotiation mode and retraining mode, etc.); the "lower" level is selected during the less critical phases of modem operation (e.g., data transmission mode or data receive mode).

First at block 710, a modem signal is received by gateway 220 from local modem device 110. The modem signal may be communicated anytime during the MoIP session, such as during the call-setup or negotiation phase, the rate renegotiation phase, the data-transmission phase, or other modem communication phase. As such, modem device 110 may be either the calling or initiating client device or the answering or destination client device. In either case, gateway 220 provides adaptive error correction for signals transmitted by modem device 110 for transmission over packet network 130.

Next at decision block 720, a control signal detector 316 determines whether the modem signal received from modem device 110 is a control signal. According to one embodiment, control signal detector 316 is configured as a tone or energy detector and determines whether the modem signal is a control signal by detecting whether certain tone detection circuitry has been activated to indicate the call setup phase, such as V.8 or V.8bis by detecting, for example, V.21 signals. In an alternative embodiment, control signal phase detector 316 is configured as a "data detector" and determines whether the modem signal is a control signal by demodulating the modem signal and inspecting its data characteristics.

If, at decision block 720, control signal detector 316 determines that the modem signal received from modem device 110 is a control signal, a signal is communicated to error mode manager 309 indicating the detection of a control signal. Since modem devices transmit control signals during important or critical phases of operation wherein control commands are transmitted (e.g., call-setup or rate negotiation, rate renegotiation, retraining, etc.), error mode manager 309 signals "higher level" error correction encoding mode signaling module 318 to instruct signal processor 204 to encode the modem signal with a corresponding high level error correction encoding scheme. Processing then continues to block 730 where signal processor 204 encodes the modem signal with the specified higher level error correction encoding scheme.

On the other hand, if control signal detector 316 determines that the modem signal received from modem device 110 is not a control signal, a signal is communicated to error mode manager 309 indicating the non-detection of a control signal. Since the current modem signal is not a control signal, the current mode of operation is considered non-critical. Accordingly, error mode manager 309 signals "lower level" error correction encoding mode signaling module 318 to instruct signal processor 204 to encode the modem signal with a corresponding lower level error correction encoding scheme. Processing then continues to block 735 where signal processor 204 encodes the modem signal with the specified lower level error correction encoding scheme.

The encoded modem signal (from block 730 or 735) is then transmitted by gateway 220 to destination gateway 140 over packet network 130 for further processing. The above process is repeated as gateway 220 processes modem signals from modem client 110, thereby providing adaptive error correction based on the mode of operation during the MoIP session.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A gateway device capable of being communicably coupled to a first client device over a communication line and to a second gateway device over a packet network, said first gateway device comprising:
   a controller configured to receive a signal from said first client device; and
   a signal processor coupled to said controller, said signal processor configured to encode said signal;
   wherein said controller is further configured to determine a mode of operation of said first client device from said signal, wherein modes of operation of said first client device include a data modem mode and a facsimile mode, wherein each mode of operation includes a plurality of phases of operation;
   wherein said controller is further configured to determine a current phase of operation from said plurality of phases of operation, while in said determined mode of operation of said first client device, based on analyzing a characteristic of said signal;
   wherein said signal processor is further configured to adaptively select a level of error correction from a plurality of levels of error correction used by said signal processor to encode said signal based on said current phase of operation of said first client device while in said determined mode of operation.

2. The gateway device of claim 1, wherein said controller is further configured to transmit said encoded signal to said second gateway device over said packet network.

3. The gateway device of claim 1, further comprising at least one tone detector communicably coupled to said controller, said tone detector configured to detect said characteristic of said signal, said characteristic indicating said current phase of operation of said first client device.

4. The gateway device of claim 1, further comprising a plurality of error correction schemes for encoding said signal, at least two error correction schemes having different levels of error correction.

5. The gateway device of claim 4, wherein said controller is further configured to select a higher level of said at least two error correction schemes for encoding said signal if said controller determines said current phase that has a control signal in said signal, said controller configured to select a lower level of said at least two error correction schemes for encoding said signal if said controller determines said current phase that has a lack of a control signal in said signal, wherein said higher level has less packet loss than said lower level.

6. The gateway device of claim 1, further comprising a low error correction scheme, a medium error correction scheme having less packet loss than said low error correction scheme, and a high error correction scheme having less packet loss than said medium error correction scheme, wherein said controller is farther configured to:
   select said high error correction scheme to encode said signal if said controller detects a control signal in said signal,
   select said low error correction scheme to encode said signal if said controller detects a lack of control signal and a lack of a data-transmit signal in said signal, and
   select said medium error correction scheme to encode said signal if said controller detects a data-transmit signal in said signal and a lack of a control signal in said signal.

7. The gateway device of claim 1, wherein said first client device comprises a facsimile device, said signal comprising a facsimile modulated signal.

8. The gateway device of claim 1, wherein said first client device comprises a modem device, said signal comprising a modem modulated signal.

9. The gateway device of claim 1, further comprising:
   a plurality of error correction schemes for encoding said signal, at least two error correction schemes having different levels of error correction; and
   a V.21 detector communicably coupled to said controller, said V.21 detector activated when said signal comprises a facsimile control signal, said controller selecting a higher level rather than a lower level of said at least two error correction schemes for encoding said signal if said controller detects the activation of said V.21 detector in said current phase, wherein said higher level has less packet loss than said lower level.

10. The gateway device of claim 9, wherein said controller selects a lower level rather than a higher level of said at least two error correction schemes for encoding said signal if said controller detects the inactivity of said V.21 detector signal in said current phase, wherein said higher level has less packet loss than said lower level.

11. The gateway device of claim 1, wherein said first gateway and said second gateway communicate in pass-through mode.

12. The gateway device of claim 1, further comprising a demodulator communicably coupled to said controller, said demodulator configured to demodulate said signal, said phase of operation of said first client device determined from said demodulated signal.

13. A method for providing adaptive error correction in a first gateway communicably coupled to a second gateway over a packet network, said first gateway further communicably coupled to a first client device, said method comprising:

receiving a signal transmitted by said first client device to said first gateway;

detecting a mode of operation of said first client device from said signal, wherein modes of operation of said first client device include a data modem mode and a facsimile mode, wherein each mode of operation includes a plurality of phases of operation;

determining a current phase of operation from said plurality of phases of operation, while in said detected mode of operation of said first client device, based on analyzing characteristic of said signal;

adaptively selecting a level of error correction from a plurality of levels of error correction to encode said signal based on said current phase of operation of said first client device while in said detected mode of operation; and encoding said signal using said level of error correction.

14. The method of claim 13, further comprising transmitting said encoded signal from said first gateway to said second gateway.

15. The method of claim 13, wherein said determining said current phase of operation of said first client device further comprises detecting a tone or energy in said signal.

16. The method of claim 15, wherein said detection of said tone or energy in said signal indicates current phase of operation of said first client device.

17. The method of claim 13, wherein said determining said current phase of operation of said first client device further comprises demodulating said signal, said demodulated signal indicating said current phase of operation of said first client device.

18. The method of claim 13, wherein said determining said current phase of operation of said first client device further comprises detecting whether said signal includes a V.21 signal.

19. The method of claim 13, wherein said first gateway and said second gateway communicate in pass-through mode.

20. The method of claim 18, wherein said selecting selects a higher level of error correction scheme rather than a lower level of error correction scheme for encoding said signal if said signal includes said V.21 signal, and wherein said selecting selects said lower level of error correction scheme rather than said higher level of error correction scheme for encoding said signal if said signal lacks said V.21 signal, wherein said higher level has less packet loss than said lower level.

* * * * *

UNITED STATES PATENT AND TRADEMARK OFFICE
CERTIFICATE OF CORRECTION

| | | |
|---|---|---|
| PATENT NO. | : 7,133,934 B1 | Page 1 of 1 |
| APPLICATION NO. | : 10/229438 | |
| DATED | : November 7, 2006 | |
| INVENTOR(S) | : Rossello et al. | |

It is certified that error appears in the above-identified patent and that said Letters Patent is hereby corrected as shown below:

In the claims, column 14, line 36, "farther" should be changed to --further--.

Signed and Sealed this

Twenty-fourth Day of April, 2007

JON W. DUDAS
*Director of the United States Patent and Trademark Office*